(12) United States Patent
Amou (10) Patent No.: US 8,219,795 B2
(45) Date of Patent: *Jul. 10, 2012

(54) INFORMATION PROCESSING APPARATUS, STORAGE MEDIUM, AND DATA RESCUE METHOD

(75) Inventor: Mitsuhiro Amou, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/888,686

(22) Filed: Sep. 23, 2010

(65) Prior Publication Data

US 2011/0016302 A1  Jan. 20, 2011

Related U.S. Application Data

(63) Continuation of application No. 11/473,001, filed on Jun. 23, 2006, now Pat. No. 7,827,396.

(30) Foreign Application Priority Data

Jun. 24, 2005  (JP) .................................. 2005-185326

(51) Int. Cl.
G06F 9/00 (2006.01)
G06F 15/177 (2006.01)

(52) U.S. Cl. ........................ 713/2; 713/1; 714/2; 714/15

(58) Field of Classification Search .................. 713/1, 2; 714/2, 15

See application file for complete search history.

(56) References Cited

U.S. PATENT DOCUMENTS

| 6,898,705 | B2 | 5/2005 | Abboud et al. |
| 6,934,881 | B2 | 8/2005 | Gold et al. |
| 7,010,634 | B2 | 3/2006 | Silvester |
| 7,047,403 | B2 | 5/2006 | Lin |
| 7,343,484 | B2 | 3/2008 | Du et al. |
| 7,464,405 | B2 | 12/2008 | Dawkins et al. |
| 7,509,530 | B2 | 3/2009 | Welts |
| 2002/0042892 | A1 | 4/2002 | Gold |
| 2002/0053044 | A1 | 5/2002 | Gold et al. |
| 2002/0188887 | A1 | 12/2002 | Largman et al. |
| 2003/0037279 | A1* | 2/2003 | Laio .................................. 714/6 |

(Continued)

FOREIGN PATENT DOCUMENTS

CN  1534490  10/2004

(Continued)

OTHER PUBLICATIONS

Japanese Office Action dated Sep. 13, 2011.

*Primary Examiner* — Thomas Lee
*Assistant Examiner* — Jaweed A Abbaszadeh
(74) *Attorney, Agent, or Firm* — Pillsbury Winthrop Shaw Pittman, LLP (57) ABSTRACT

According to one embodiment of an information processing apparatus includes: a storage medium including, a first partition that stores a first operating system and data, and a second partition that stores a second operating system and a data rescue program; a switch that allows a user to enter a command for booting the second operating system; and a boot control section that boots the second operating system when the command is entered. The data rescue program is executed when the second operating system is booted, and performs at least one of recovering and backing up the data stored in the first partition.

6 Claims, 6 Drawing Sheets

U.S. PATENT DOCUMENTS

| | | |
|---|---|---|
| 2003/0182547 A1 | 9/2003 | Kumagai |
| 2004/0044886 A1 | 3/2004 | Ng et al. |
| 2004/0078680 A1 | 4/2004 | Hu et al. |
| 2004/0153724 A1* | 8/2004 | Nicholson et al. ............ 714/6 |
| 2004/0153733 A1 | 8/2004 | Lin |
| 2004/0172578 A1 | 9/2004 | Chen et al. |
| 2006/0150037 A1 | 7/2006 | Wang |
| 2006/0161811 A1* | 7/2006 | Welts ............................ 714/15 |
| 2007/0050577 A1* | 3/2007 | Kimura et al. ............... 711/162 |

FOREIGN PATENT DOCUMENTS

| | | |
|---|---|---|
| EP | 1199636 | 4/2004 |
| EP | 1413956 | 4/2004 |
| EP | 1510920 | 3/2005 |
| JP | 2003-280914 | 10/2003 |
| JP | 2004-013563 | 1/2004 |

* cited by examiner

INFORMATION PROCESSING APPARATUS, STORAGE MEDIUM, AND DATA RESCUE METHOD

CROSS-REFERENCE TO RELATED APPLICATIONS

This application is a continuation of U.S. application Ser. No. 11/473,001, filed Jun. 23, 2006, now U.S. Pat. No. 7,827,396 and for which priority is claimed under 35 U.S.C. §120. This application is based upon and claims the benefit of priority under 35 U.S.C. §119 from the prior Japanese Patent Application No. 2005-185326, filed on Jun. 24, 2005, the entire contents of both applications are incorporated herein by reference in their entireties.

BACKGROUND

1. Field

One embodiment of the invention relates to an information processing apparatus and a data rescue method that makes it possible to rescue data if an ordinary operating system is corrupted.

2. Description of the Related Art

A personal computer performs various types of processing by storing an operating system, applications, data created by the applications, and the like in a hard disk drive and reading them from the hard disk drive.

However, if a part of the data of the operating system is broken, the personal computer cannot be used. In this case, the operating system is again installed, whereby it is made possible to again use the personal computer.

United States Patent Application Publication No. 2004/0078680 A1 discloses an technique wherein a backup unit that can be booted by a computer is connected to a personal computer and the personal computer is booted from the backup unit, whereby all data in a hard disk drive of the personal computer is backed up and the backed-up data is restored in the hard disk drive.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an information processing apparatus including: a storage medium including, a first partition that stores a first operating system and data, and a second partition that stores a second operating system and a data rescue program; a switch that allows a user to enter a command for booting the second operating system; and a boot control section that boots the second operating system when the command is entered. The data rescue program is executed when the second operating system is booted, and performs at least one of recovering and backing up the data stored in the first partition.

First, the configuration of an information processing apparatus according to one embodiment of the invention will be described with reference to FIG. 1. The information processing apparatus is implemented as a portable notebook personal computer 10 that can be driven with a battery.

Figure 1:
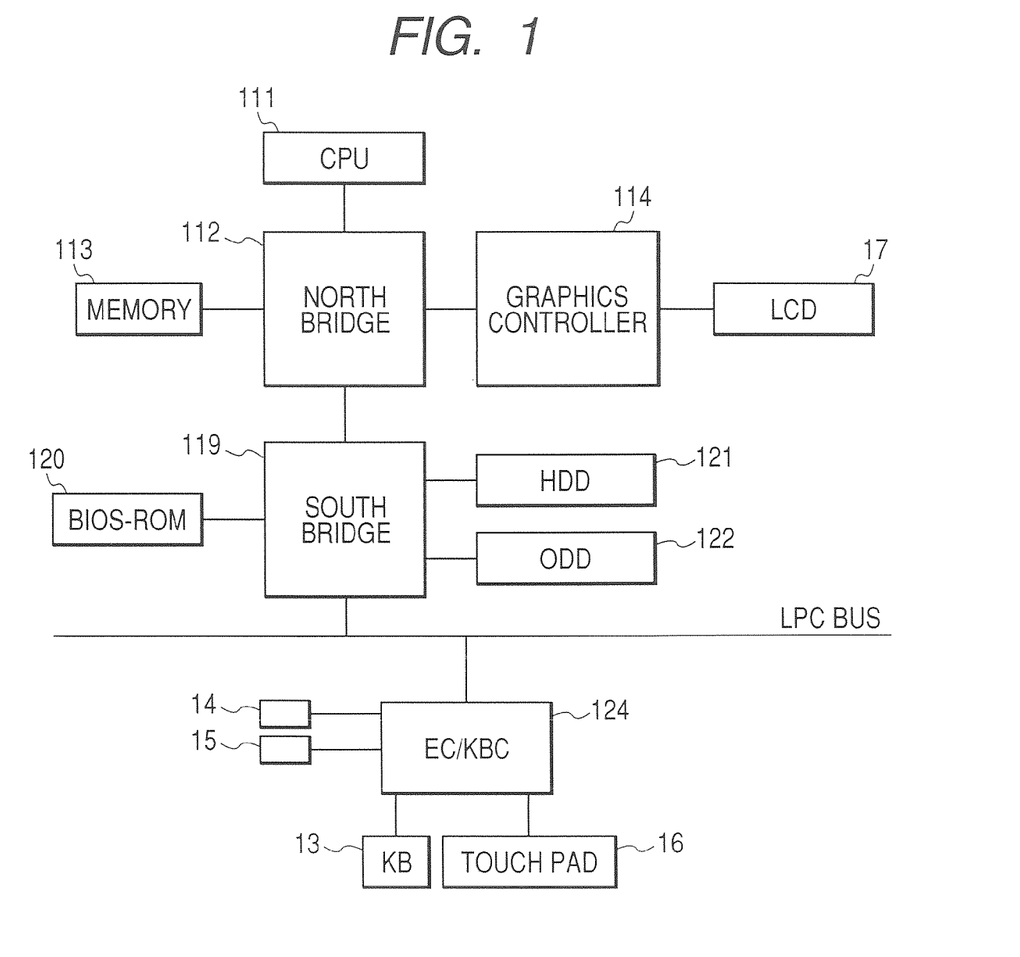
FIG. 1 is an exemplary block diagram showing a system configuration of an information processing apparatus according to one embodiment of the invention.

FIG. 1 is an exemplary block diagram showing the system configuration of the information processing apparatus according to the embodiment of the invention.

As shown in FIG. 1, the computer 10 includes a CPU 111, a north bridge 112, main memory 113, a graphics controller 114, a south bridge 119, a BIOS-ROM 120, a hard disk drive (HDD) 121, an embedded controller/keyboard controller IC (EC/KBC) 124, a power supply controller 125, and the like.

The CPU 111 is a processor provided for controlling the operation of the computer 10 and executes an operating system (OS) and various application programs loaded into the main memory 113 from the hard disk drive 121.

The CPU 111 also executes a BIOS (Basic Input Output System) program stored in the BIOS-ROM 120. The BIOS program in the BIOS-ROM 120 is a program for controlling hardware.

The north bridge 112 is a bridge device for connecting a local bus of the CPU 111 and the south bridge 119. The north bridge 112 also contains a memory controller for controlling access to the main memory 113. The north bridge 112 also has a function of executing communications with the graphics controller 114 via an AGP (Accelerated Graphics Port) bus, etc.

The graphics controller 114 is a display controller for controlling an LCD 17 used as a display monitor of the computer 10. The graphics controller 114 has video memory (VRAM) 114A and generates a video signal for forming a display image to be displayed on the LCD 17 of a display unit 12 from display data written into the video memory 114A by OS/application program.

The south bridge 119 controls devices on an LPC (Low Pin Count) bus. The south bridge 119 contains an IDE (Integrated Drive Electronics) controller for controlling the hard disk drive (HDD) 121 and an optical disk drive (ODD) 122. Further, the south bridge 119 also has a function to control access to the BIOS-ROM 120.

The optical disk drive 122 is a drive unit for driving a storage medium such as a DVD or a CD. The optical disk drive 122 is also a drive unit for writing data onto recordable optical media such as a CD-R and a DVD-R and writing/erasing data to/from rewritable optical media such as a CD-RW, a DVD-RW, and a DVD-RAM.

The embedded controller/keyboard controller IC (EC/KBC) 124 is a one-chip microcomputer into which an embedded controller for power management and a keyboard controller for controlling a keyboard (KB) 13, a backup button 15, and a touch pad 16 are integrated. The embedded controller/keyboard controller IC (EC/KBC) 124 has a function of turning on/off the power of the computer 10 in response to user's operation of a power button 14 by operating in cooperation with power supply controller 125.

Figure 2:
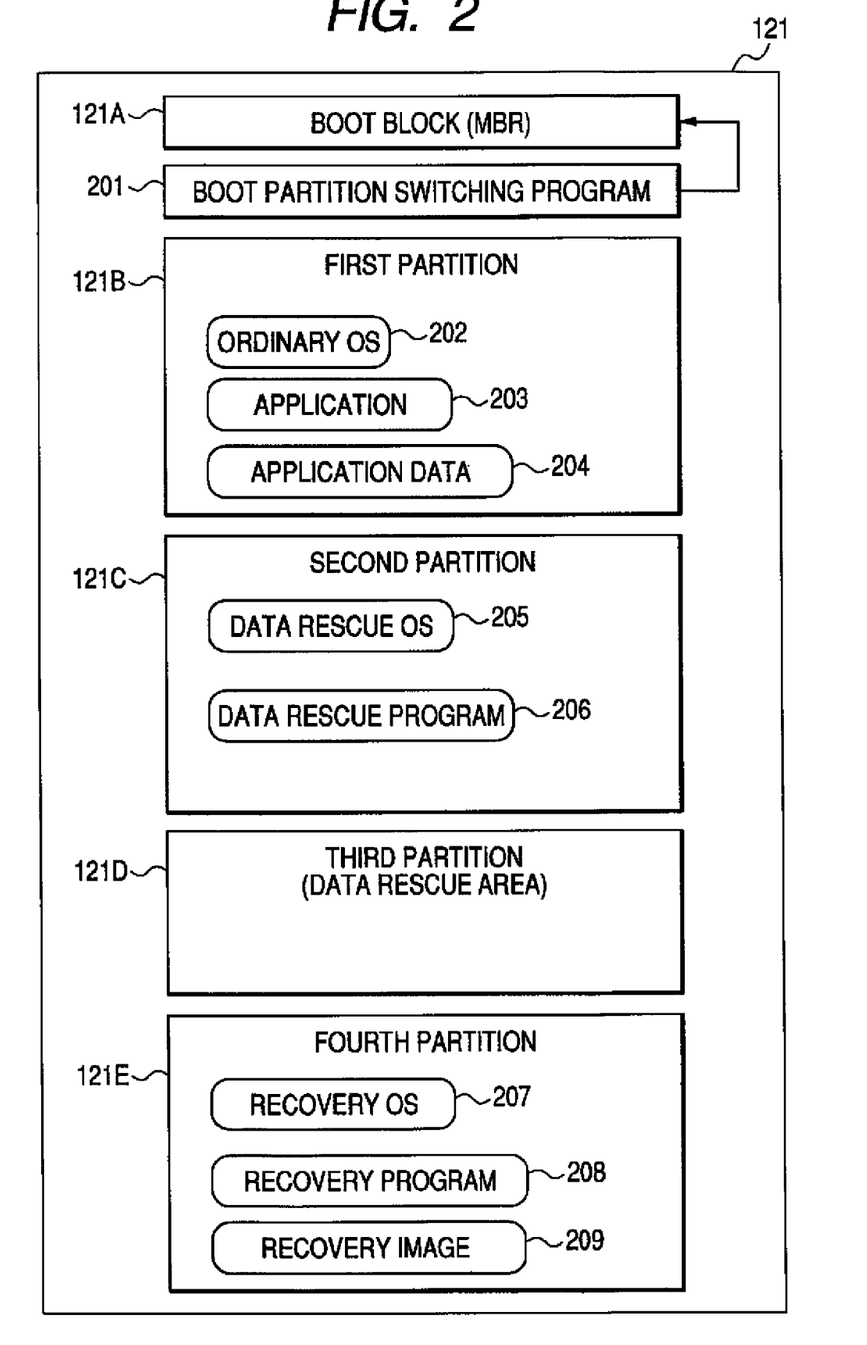
FIG. 2 is an exemplary drawing showing a configuration of a hard disk drive in the information processing apparatus according to the embodiment.

A configuration of the hard disk drive 121 will be described with reference to FIG. 2. As shown in FIG. 2, the hard disk drive 121 has a boot block 121A called master boot record (MBR), a first partition 121B, a second partition 121C, a third partition 121D, and a fourth partition 121E.

The boot block 121A has a function of recognizing an active partition by referencing a partition table that the boot block 121A has and a function of booting the system from the active partition.

A boot partition switching program 201 as a boot control section inquires of the BIOS program in the BIOS-ROM 120 which partition the system is to be booted from when the boot partition switching program 201 is called (booted) from the BIOS program in the BIOS-ROM 120. And upon receiving a reply, the boot partition switching program 201 makes setting to change the partition corresponding to the pressed key to an active partition (and setting to change other partitions to inactive partitions) in the partition table of the boot block 121A.

The first partition 121B is usually an active partition and an ordinary operating system 202 is booted. In addition to the ordinary operating system 202, application data 204 created using an application 203 is stored in the first partition 121B.

The second partition 121C has a data rescue operating system 205 booted when the user operates the power button 14 while pressing the backup button 15, and a data rescue program 206 executed when the data rescue operating system 205 is booted. The user presses the power button 14 and the backup button 15 at the same time, thereby entering a command to boot the data rescue operating system 205.

The third partition 121D is an area to back up the application data 204, etc., in the first partition 121B by the data rescue program 206.

The fourth partition 121E has a recovery operating system 207 and a recovery program 208 booted for restoring the first partition 121B to the state at the factory default (initial state) and a recovery image 209 corresponding to the state of the first partition 121B at the state at the factory default.

One of the causes for making it impossible to boot the ordinary operating system 202 is the case where a part of the data of the ordinary operating system 202 is broken although the hard disk drive 121 does not fail. In such a case, the user operates the power button 14 while pressing the backup button 15, whereby the application data 204 of the application 203 such as a word processor, created by the user can be rescued.

Figure 3:
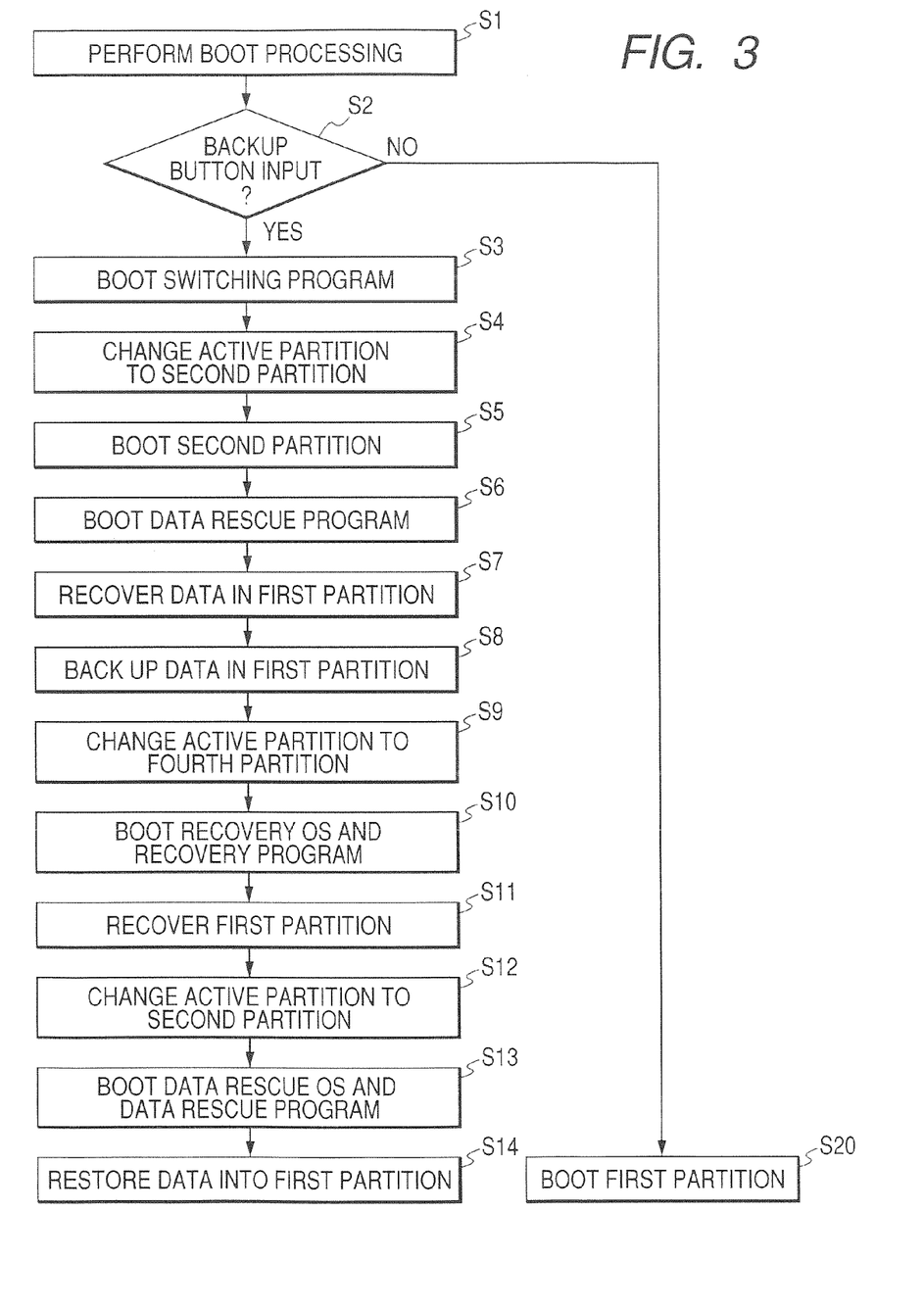
FIG. 3 is an exemplary flowchart describing a data rescue procedure according to the embodiment.

Next, a rescue method of the application data 204 when a part of the first partition 121B is broken according to the embodiment will be described with reference to an exemplary flowchart of FIG. 3.

When the user operates the power button 14, boot processing conforming to the BIOS program in the BIOS-ROM 120 is executed (block S1). Here, first, initial setting of system memory and I/O control hardware is performed.

Upon completion of the initialization, the operation of each I/O is made possible. The BIOS program in the BIOS-ROM 120 inquires of the EC/KBC 124 whether or not the backup button 15 is pressed, and determines whether or not the backup button 15 is pressed (block S2).

If the backup button 15 is not pressed (NO at block S2), the ordinary operating system 202 is booted.

If the backup button 15 is pressed (YES at block S2), the BIOS program in the BIOS-ROM 120 boots the boot partition switching program 201 (block S3). The boot partition switching program 201 inquires of the BIOS program in the BIOS-ROM 120 which partition is to be booted.

Upon receiving a reply meaning that the active partition is the second partition 121C from the BIOS-ROM 120, the boot partition switching program 201 makes setting to change the second partition 121C to the active partition and setting to change the first partition 121B to an inactive partition in the partition table of the boot block 121A (block S4).

The BIOS program in the BIOS-ROM 120 reads the boot block (MBR) 121A into the memory and passes the processing to the boot block 121A. To recognize which partition the active partition is, the boot block 121A searches a partition table. Then, the boot block 121A recognizes that the active partition is the second partition 121C, and passes the processing to a boot sector in the second partition 121C. Accordingly, the active partition (second partition 121C) is booted from the boot sector (block S5).

After the second partition 121C is booted, automatically the data rescue program 206 is booted (block S6). The data rescue program 206 attempts to recover the data stored in the first partition 121B where a part of data seems to be corrupted (block S7). The data rescue program 206 backs up predetermined data such as the application data 204 and setup data of the application 203 other than the ordinary operating system 202 to the third partition 121D automatically or in accordance with user selection (block S8). The data that cannot be recovered in the preceding block is not backed up.

After the data rescue program 206 backs up the data, the data rescue program 206 saves setting for booting the system from the fourth partition 121E (changing the fourth partition 121E to the active partition) in the partition table of the boot block 121A (block S9). The data rescue program 206 makes setting so as to boot the system in a mode to restore the data backed up to the third partition 121D into the first partition 121B when the data rescue program 206 is next booted.

After making the setting, the data rescue program 206 again boots the system. Since setting is made so that the system is booted from the fourth partition 121E before the re-booting, the system is booted from the fourth partition 121E, whereby the recovery operating system 207 is booted. When the recovery operating system 207 is booted, the recovery program 208 is automatically booted (block S10). The recovery program 208 initializes the first partition 121B and then writes the recovery image 209 into the first partition 121B to restore the first partition 121B to the state at the factory default (block S11). After completion of writing the recovery image 209, the recovery program 208 saves setting for booting the system from the second partition 121C (changing the second partition 121C to the active partition) in the partition table of the boot block 121A (block S12).

After saving the setting, the recovery program 208 again boots the system. Since setting is made so that the system is booted from the second partition 121C before the re-booting, the system is booted from the second partition 121C even if the user performs no operation, whereby the data rescue operating system 205 is booted. When the data rescue operating system 205 is booted, the data rescue program 206 is automatically booted (block S13). The setting is made so as to boot the system in the mode to restore the data backed up to the third partition 121D at block S8 into the first partition 121B. The data rescue program 206 restores the data backed up to the third partition 121D into the first partition 121B (block S14).

After completion of the restoration processing, the data rescue program 206 initializes the boot setting of the data rescue program 206. The data rescue program 206 saves setting for booting the system from the first partition 121B (changing the first partition 121B to the active partition) in the partition table of the boot block 121A.

After saving the setting, the data rescue program 206 again boots the system. Since setting is made so that the system is booted from the first partition 121B before the re-booting, the system is booted from the first partition 121B even if the user performs no operation. An initialization program is executed at the first booting time after the recovery.

According to the embodiment, if a part of the data of the ordinary operating system 202 in the first partition 121B is broken, the data rescue operating system 205 and the data rescue program 206 in the second partition 121C are booted, whereby the data in the first partition 121B is recovered and then the data in the first partition 121B is backed up to the third partition 121D, whereby the data retained in the first partition 121B can be rescued.

The recovery operating system 207 and the recovery program 208 in the fourth partition 121E are booted, whereby the first partition 121B can be restored to the state at the factory default.

After the first partition 121B is restored, the data backed up to the third partition 121D by the data rescue program 206 is restored into the first partition 121B, whereby the data is stored at a position similar to that at the backup time and thus the user can immediately recognize the restored location of the data.

Modified Example 1

Figure 4:
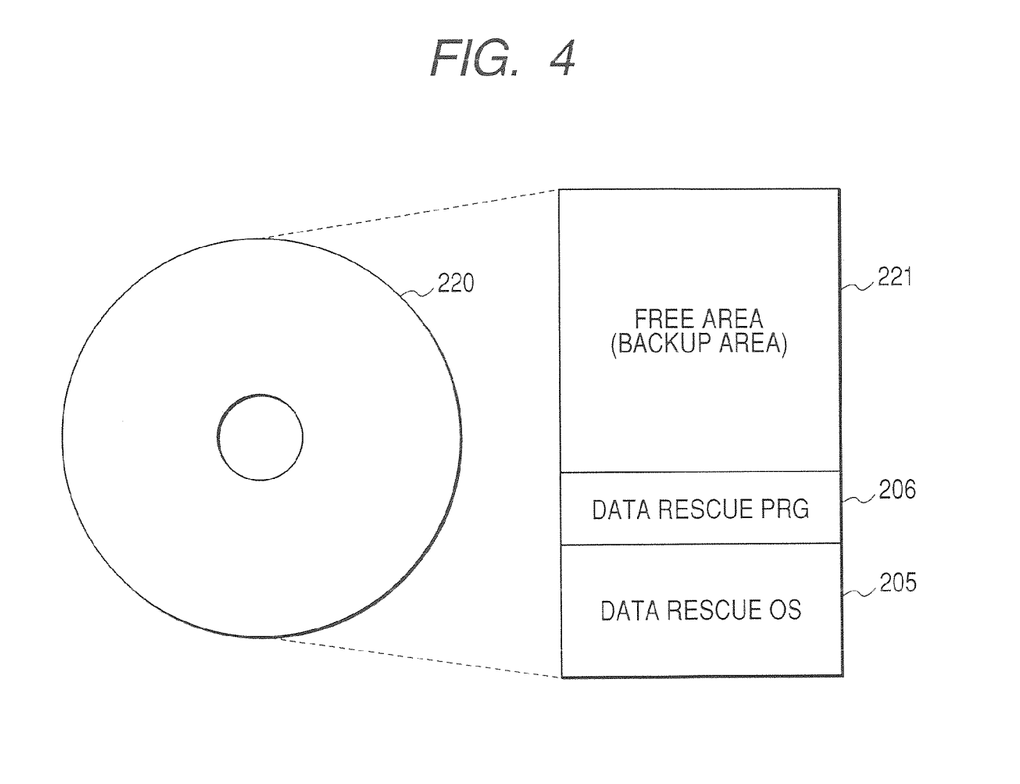
FIG. 4 is an exemplary drawing showing a data structure in an optical disk according to a modified example of the embodiment.

The data rescue operating system 205 and the data rescue program 206 may be stored in a rewritable optical disk 220, as shown in FIG. 4. If the system cannot be booted from the first partition 121B, the optical disk 220 is stored in the optical disk drive 122 and the system is booted from the optical disk drive 122, whereby the data rescue operating system 205 is booted and then the data rescue program 206 is automatically booted. The data rescue program 206 copies the data stored in the hard disk drive 121 into a free area (storing area) 221 of the optical disk 220.

After the data is copied, the state is recovered to the state at the factory default in the hard disk drive 121 and then again the system is booted from the optical disk 220 and the data rescue operating system 205 and the data rescue program 206 are booted. The data copied by the data rescue program 206 into the free area 221 in the optical disk 220 is restored into the first partition 121B of the hard disk drive 121. The data restored into the hard disk drive 121 from the optical disk 220 may be all data or may be some data.

According to the above configuration, the data rescue operating system 205 and the data rescue program 206 for rescuing data need not be retained in the hard disk drive 121, so that the free area of the hard disk drive 121 increases, leading to an increase in the area available for the user.

For example, storage section using flash memory may be adopted in place of a rewritable medium such as an optical disk.

Modified Example 2-1

Figure 5:
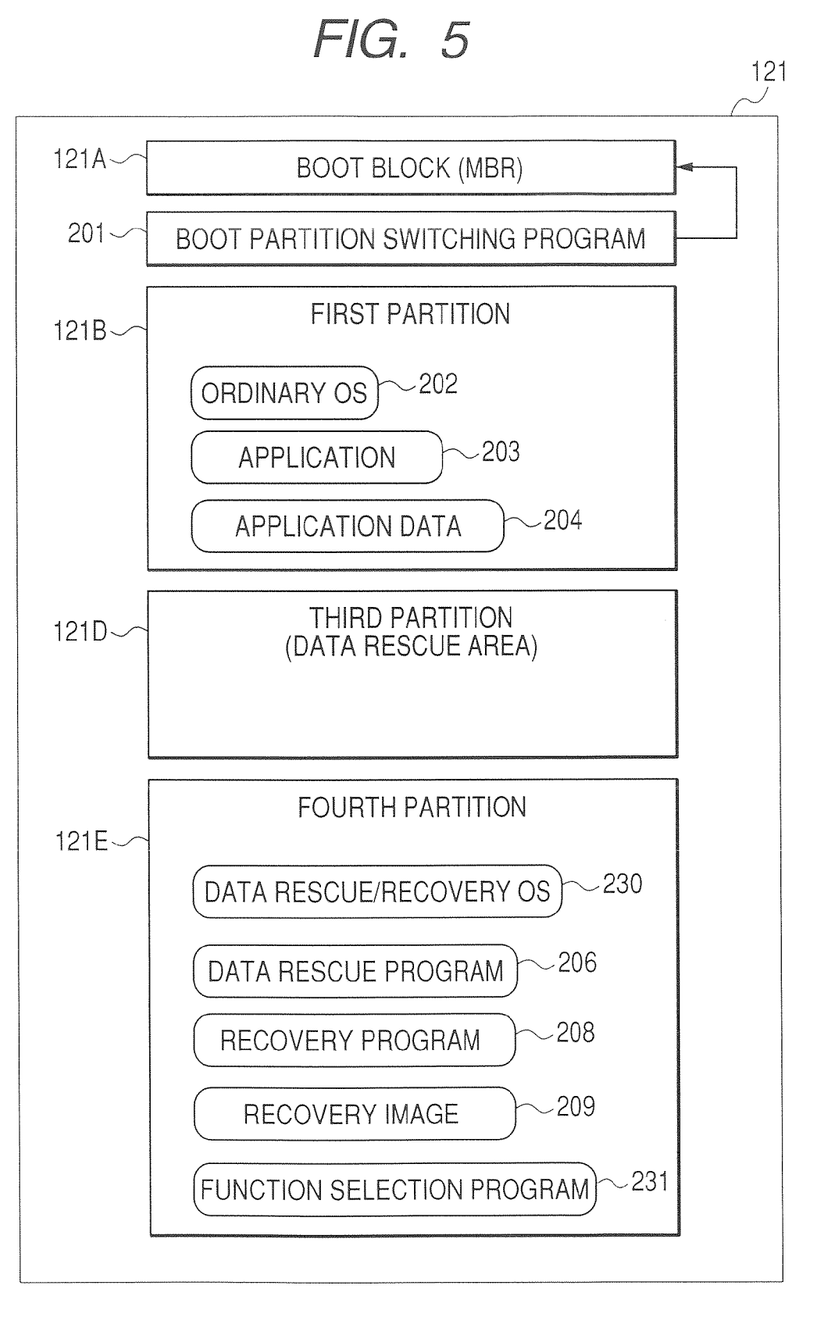
FIG. 5 is an exemplary drawing showing a configuration of a hard disk drive in the information processing apparatus according to a modified example of the embodiment.

In the embodiment described above, the partition in which the data rescue operating system 205 and the data rescue program 206 to back up the first partition 121B are stored and the partition in which the recovery operating system 207 and the recovery program 208 for restoring the first partition 121B to the state at the factory default are stored are separate. However, a data rescue/recovery operating system 230, the data rescue program 206, the recovery program 208, the recovery image 209, and a function selection program 231 can also be stored in the fourth partition 121E of one partition, as shown in FIG. 5.

If the user operates the power button 14 while pressing the backup button 15, the boot partition switching program 201 switches the active partition to the fourth partition 121E. After the data rescue/recovery operating system 230 is booted, the function selection program 231 is automatically booted.

The function selection program 231 displays a menus screen on the LCD 17, requesting the user to select any function to execute from among "1. Back up," "2. Restore data," and "3. Recover first partition." If the user selects "1. Back up," the data rescue program 206 is booted and the data backup function is executed. The data in the first partition 121B is backed up to the third partition 121D as in the embodiment described above.

If the user selects "2. Restore data," the data rescue program 206 is booted and the function to restore the data backed up to the third partition 121D into the first partition 121B is executed. The function selection program 231 may have a function for suppressing selection of "2. Restore data" if the second partition 121C is searched and backed up data does not exist in the second partition 121C.

If the user selects "3. Recover first partition," the function selection program 231 boots the recovery program 208. The recovery program 208 formats the first partition 121B and then restores the first partition 121B to the state at the factory default using the recovery image 209.

In the modified example, the two operating systems of the ordinary operating system 202 and the data rescue/recovery operating system 230 may be provided in the hard disk drive 121 as the operating systems and therefore the operating systems occupying the hard disk drive 121 can be decreased in size. That is, the data rescue/recovery operating system 230 is smaller in size than the ordinary operating system 202.

Modified Example 2-2

Figure 6:
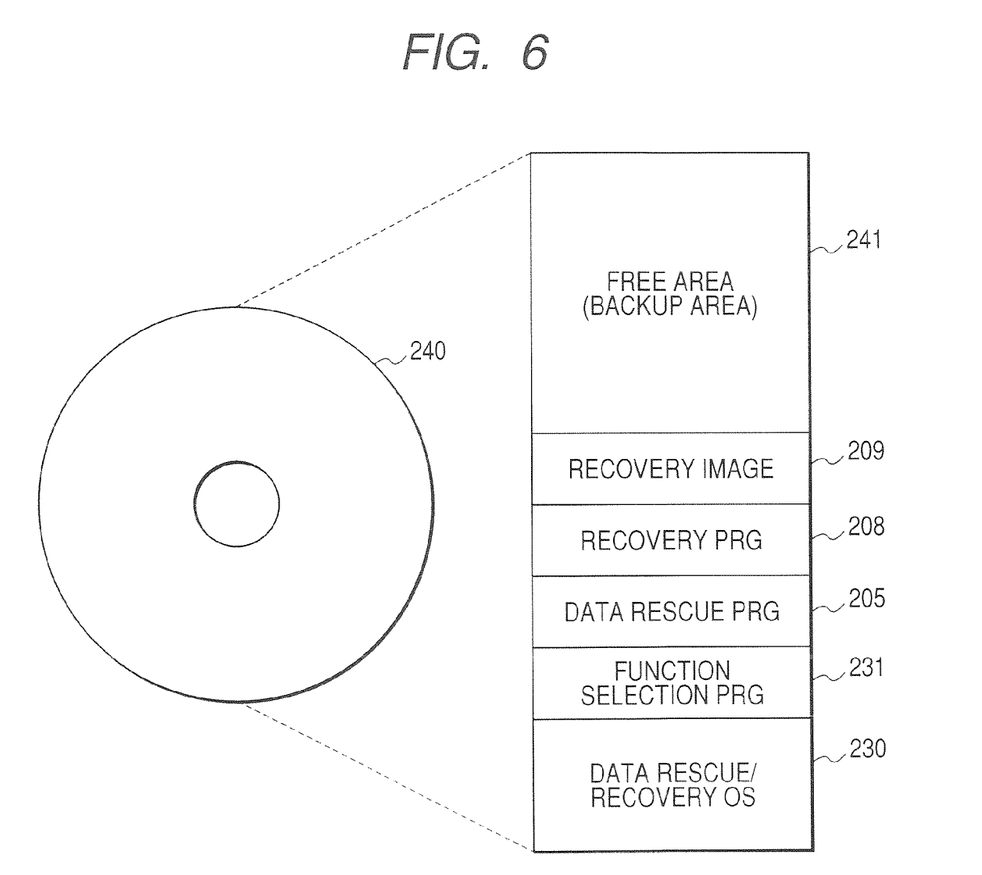
FIG. 6 is an exemplary drawing showing a data structure in an optical disk according to a modified example of the embodiment.

As a modified example of modified example 2-1, the data rescue/recovery operating system 230, the data rescue program 206, the recovery program 208, the recovery image 209, and the function selection program 231 may be stored in a rewritable optical disk 240 as in modified example 1. The data in the hard disk drive 121 may be backed up to a free area 241 of the optical disk 240.

According to modified example 2-2, the data rescue/recovery operating system 230, the data rescue program 206 for rescuing data, and the recovery image 209 and the recovery program 208 for restoring the first partition 121B to the state at the factory default need not be retained in the hard disk drive 121, so that the free area of the hard disk drive 121 increases, leading to an increase in the area available for the user.

For example, storage section using flash memory may be adopted in place of a rewritable medium such as an optical disk.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all the components disclosed in the embodiments. Further, components in different embodiments may be appropriately combined.

What is claimed is:

1. An information processing apparatus comprising:
a storage medium comprising,
a first partition that stores a first operating system and data; and
a second partition that stores a second operating system, a data rescue program, a third operating system, a recovery image for recovering the first partition into an initial state, and a recovery program for recovering the first partition into the initial state using the recovery image;
an embedded controller that received various commands from external devices, the various commands comprising a command for booting the second operating system; and
a boot control section that boots the second operating system when the command is received by the embedded controller,
wherein, upon the second operating system being booted, the data rescue program is executed to automatically:
recover at least a portion of the data stored in the first partition and back up the data portion into another partition, other than the first partition,
boot from the second partition and employ the recovery image stored in the second partition to recover the first partition into the initial state, and
restore the backed up data portion in the another partition into the first partition.

2. The apparatus of claim 1 further comprising:
a switch that allows a user to enter the command for booting the second operating system.

3. The apparatus of claim 2, wherein the switch comprises:
a power button that outputs a command for booting the first operating system stored in the first partition, when pressed; and
a backup button that outputs the command for booting the second operating system, when pressed with the power button at the same time.

4. The apparatus of claim 1, wherein the storage medium further comprises a boot block that for booting one of the first and second operating systems, and
wherein the boot control section instructs the boot block to boot the second operating system when the command for booting the second operating system is received by the embedded controller.

5. The apparatus of claim 1, wherein the second operating system is smaller in size than the first operating system.

6. A data rescue method of an information processing apparatus comprising a storage medium that comprises a first partition that stores a first operating system and data; and a second partition that stores a second operating system, a data rescue program, a third operating system, a recovery image for recovering the first partition into an initial state, and a recovery program for recovering the first partition into the initial state using the recovery image, the data rescue method comprising:
booting the second operating system; and
executing the data rescue program when the second operating system is booted to automatically:
recover at least a portion of the data stored in the first partition and back up the data portion into another partition,
boot from the second partition and employ the recovery image stored in the second partition to recover the first partition into the initial state, and
restore the backed up data portion in the another partition into the first partition.

* * * * *